(12) United States Patent
Gormley

(10) Patent No.: US 11,692,509 B2
(45) Date of Patent: Jul. 4, 2023

(54) HIDDEN DRAG LINK FOR THRUST REVERSER ASSEMBLY

(71) Applicant: ROHR, INC., Chula Vista, CA (US)

(72) Inventor: Timothy Gormley, Bonita, CA (US)

(73) Assignee: Rohr, Inc., Chula Vista, CA (US)

(*) Notice: Subject to any disclaimer, the term of this patent is extended or adjusted under 35 U.S.C. 154(b) by 5 days.

(21) Appl. No.: 17/370,978

(22) Filed: Jul. 8, 2021

(65) Prior Publication Data

US 2023/0012009 A1   Jan. 12, 2023

(51) Int. Cl.
  *F02K 1/72*  (2006.01)
  *F02K 1/76*  (2006.01)

(52) U.S. Cl.
  CPC ............ *F02K 1/72* (2013.01); *F02K 1/763* (2013.01)

(58) Field of Classification Search
  CPC ............ F02K 1/72; F02K 1/763; F02K 1/70
  See application file for complete search history.

(56) References Cited

U.S. PATENT DOCUMENTS

| 10,006,405 | B2 | 6/2018 | Stuart et al. |
| 10,724,473 | B2 | 7/2020 | Carr |
| 10,837,404 | B2 | 11/2020 | Aziz et al. |
| 10,844,807 | B2 | 11/2020 | Carr |
| 2015/0267640 | A1* | 9/2015 | Gormley ............... F02K 1/80 239/265.19 |
| 2015/0267641 | A1* | 9/2015 | Gormley ............... F02K 1/766 239/265.19 |
| 2016/0245228 | A1* | 8/2016 | Gormley ............... F02K 1/763 |
| 2020/0263632 | A1* | 8/2020 | Ganapathi Raju ........ F02K 1/72 |

FOREIGN PATENT DOCUMENTS

| EP | 2243945 | 10/2010 |
| EP | 2937551 | 10/2015 |
| EP | 3244053 | 11/2017 |
| EP | 3293387 | 3/2018 |
| EP | 3293388 | 3/2018 |
| FR | 2379705 A1 * | 1/1978 ............... F02K 1/72 |

OTHER PUBLICATIONS

European Patent Office, European Search Report dated Nov. 25, 2022 in Application No. 22183921.0.

* cited by examiner

*Primary Examiner* — Andrew H Nguyen
(74) *Attorney, Agent, or Firm* — Snell & Wilmer L.L.P.

(57) ABSTRACT

A thrust reverser assembly may comprise a cascade of vanes and a sleeve configured to translate relative to the cascade of vanes. The sleeve may include an inner sleeve portion, an outer sleeve portion, and a pressure sleeve portion. The pressure sleeve portion may be located radially inward of the outer sleeve portion and may extend forward from the inner sleeve portion. A blocker door may be hingedly coupled to the pressure sleeve portion. A drag link may be pivotably coupled to the blocker door. A forward end of the drag link may be configured to deploy radially inward in response to aft translation of the sleeve.

7 Claims, 11 Drawing Sheets

HIDDEN DRAG LINK FOR THRUST REVERSER ASSEMBLY

FIELD

The present disclosure relates to aircraft nacelles, and, more particularly, to a thrust reverser assembly having a hidden drag link.

BACKGROUND

A nacelle for a turbine engine typically includes an inlet, a fan cowl, a thrust reverser, and an exhaust section. The nacelle is typically mounted to a wing or a fuselage of an aircraft via a pylon. The thrust reverser may include a cascade of vanes and a translating sleeve. A plurality of blocker doors may be pivotally connected to the translating sleeve. The blocker doors may be connected through a drag link coupled to an inner fixed structure (IFS) of the nacelle. The IFS and inner surface of the translating sleeve typically define a bypass flow duct. The drag links and/or blocker doors may be located in the bypass flow duct and can affect the smoothness of flow path surfaces (i.e., the surfaces of the bypass duct), which tends to increase drag and/or noise during operation.

SUMMARY

A thrust reverser assembly is disclosed herein. In accordance with various embodiments, the thrust reverser assembly may comprise a cascade of vanes and a sleeve configured to translate relative to the cascade of vanes. The sleeve may include an inner sleeve portion, an outer sleeve portion, and a pressure sleeve portion. The pressure sleeve portion may be located radially inward of the outer sleeve portion and may extend forward from the inner sleeve portion. A blocker door may be hingedly coupled to the pressure sleeve portion. A drag link may be pivotably coupled to the blocker door. A forward end of the drag link may be configured to deploy radially inward in response to aft translation of the sleeve.

In various embodiments, the drag link may be located along a first surface of the blocker door, when the blocker door is in a stowed state. In various embodiments, the blocker door may include a guide arm extending from a second surface of the blocker door, the second surface being opposite the first surface.

In various embodiments, a guide arm track may be configured to receive a distal end of the guide arm. A portion of the guide arm track may be sloped in a radially inward direction. In various embodiments, a guide roller may be rotatably coupled to the distal end of the guide arm and located in the guide arm track.

In various embodiments, the drag link may be pivotably coupled to the blocker door via a pivot joint located at an aft end of the blocker door. In various embodiments, a clevis may be configured to receive a pin located at the forward end of the drag link. In various embodiments, locating the pin in the clevis may prevent aft translation of the forward end of the drag link and cause the aft end of the blocker door to rotate radially inward in response to aft translation of the pressure sleeve portion.

A nacelle is also disclosed herein. In accordance with various embodiments, the nacelle may comprise an inner fixed structure and a thrust reverser assembly radially outward of the inner fixed structure. The thrust reverser assembly may comprise a sleeve, a blocker door, and a drag link. The sleeve may be configured to translate relative to the inner fixed structure. The sleeve may include an inner sleeve portion, an outer sleeve portion, and a pressure sleeve portion. The pressure sleeve portion may be located radially inward of the outer sleeve portion and may extend forward from the inner sleeve portion. The blocker door may be hingedly coupled to the pressure sleeve portion. The drag link may be pivotably coupled to the blocker door. A forward end of the drag link may be configured to translate toward the inner fixed structure in response to aft translation of the sleeve.

In various embodiments, the drag link may be configured to couple to the inner fixed structure in response to the sleeve translating to an open position. The drag link may be configured to disconnect from the inner fixed structure in response to the sleeve translating from the open position to a closed position. In various embodiments, a clevis may be coupled to the inner fixed structure and configured to receive a pin located at the forward end of the drag link. Locating the pin in the clevis may prevent aft translation of the forward end of the drag link and may cause an aft end of the blocker door to rotate radially inward in response to aft translation of the pressure sleeve portion.

In various embodiments, when the blocker door is in a stowed state, the drag link may be located along a first surface of the blocker door. In various embodiments, the first surface of the blocker door may define a groove configured to receive the drag link.

In various embodiments, the blocker door may include a guide arm extending from a second surface of the blocker door, the second surface being opposite the first surface. In various embodiments, a guide arm track may be configured to receive a distal end of the guide arm. A portion of the guide arm track may be sloped in a radially inward direction.

In various embodiments, the drag link may be pivotably coupled to the blocker door via a pivot joint located at an aft end of the blocker door. In various embodiments, the drag link may include a link roller located at an aft end of the drag link. In various embodiments, a link track may be coupled to the inner sleeve portion and configured to receive the link roller.

A deployable drag link for a thrust reverser assembly is also disclosed herein. In accordance with various embodiments, the deployable drag link comprises a drag link having a forward end and an aft end. The drag link may be rotatable about a pivot joint. The forward end of the drag link may be configured to rotate radially inward as the thrust reverser assembly translates into a reverse thrust position.

In various embodiment, a blocker door may be coupled to the drag link. A radially inward surface of the block door may define a groove configured to receive the drag link.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Surface shading and/or crosshatching lines may be used throughout the figures to denote different parts, but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" and "aftward" refer to the direction associated with the tail (i.e., the back end) of an aircraft, or generally, to the direction of exhaust of the gas turbine engine. As used herein, "forward" refers to the direction associated with the nose (i.e., the front end) of an aircraft, or generally, to the direction of flight or motion.

A first component that is "radially outward" of a second component means that the first component is positioned at a greater distance away from a central longitudinal axis of the nacelle than the second component. A first component that is "radially inward" of a second component means that the first component is positioned closer to the central longitudinal axis of the nacelle than the second component.

Figure 1A:
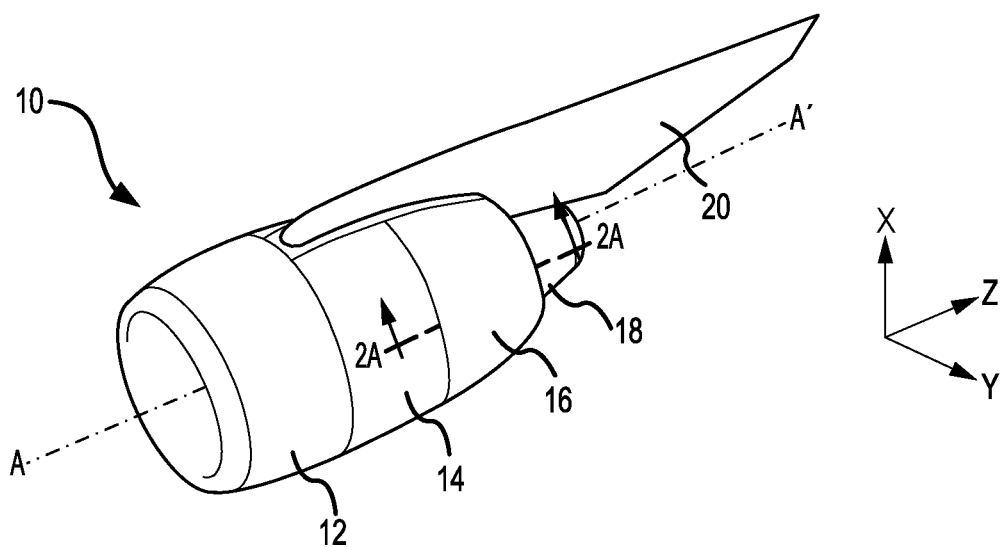
FIG. 1A illustrates a perspective view of a nacelle of a propulsion system, in accordance with various embodiments.

Referring to FIG. 1A, a nacelle 10 for a propulsion system is illustrated, in accordance with various embodiments. Nacelle 10 may comprise an inlet assembly 12, a fan cowl assembly 14, a thrust reverser assembly 16, and an exhaust system 18. In various embodiments, nacelle 10 may include a pylon 20. Pylon 20 may be configured to mount nacelle 10 and an engine surrounded by nacelle 10 to an aircraft structure, such as a wing or aircraft fuselage.

Figure 1B:
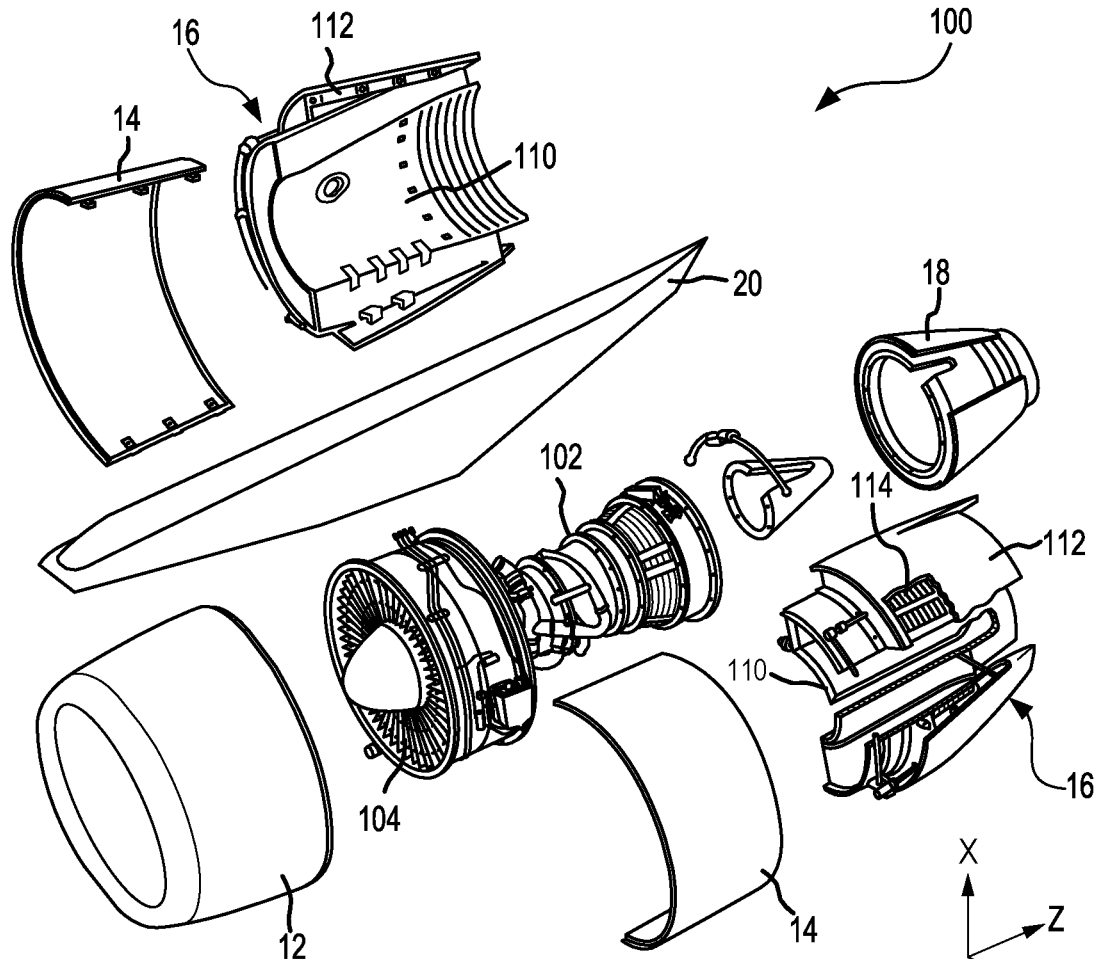
FIG. 1B illustrates an exploded view of a propulsion system, in accordance with various embodiments.

With reference to FIG. 1B, and continuing reference to FIG. 1A, an exploded view of a propulsion system 100 is illustrated. In accordance with various embodiments, propulsion system 100 includes nacelle 10 and a gas turbine engine 102. Gas turbine engine 102 may be surrounded by components of nacelle 10. Nacelle 10 may provide smooth aerodynamic surfaces for airflow around and into gas turbine engine 102. Nacelle 10 may define at least a portion of one or more bypass air duct(s) through propulsion system 100.

In operation, a fan 104 of gas turbine engine 102 draws and directs a flow of air into and through propulsion system 100. The air may be divided into two principal flow paths: a core flow path through the core of gas turbine engine 102, and a bypass flow path through one or more bypass ducts outside of the core of gas turbine engine 102. The air in the core flow path may be directed through a compressor of gas turbine engine 102 that increases the air flow pressure, and then through a combustor of gas turbine engine 102 where the air is mixed with fuel and ignited. The combustion of the fuel and air mixture causes a series of turbine blades aft of the combustor to rotate and drive the rotors of the compressor and the fan of gas turbine engine 102. The exhaust gases are then directed through exhaust system 18.

The air in the bypass flow path may be directed around the engine core through one or more duct(s) defined by nacelle 10. In various embodiments, at least a portion of the bypass flow path is defined by thrust reverser assembly 16 and an inner fixed structure (IFS) 110. For example, thrust reverser assembly 16 may comprise a translating sleeve 112, and the bypass air output from fan 104 may flow between an exterior (or radially outward) surface of IFS 110 and an interior (or radially inward) surface of translating sleeve 112. In accordance with various embodiments, thrust reverser assembly 16 may include a cascade of vanes 114 (referred to herein as cascade 114). As discussed in further detail below, translating sleeve 112 is configured to translate aftward and expose cascade 114, thereby generating reverse thrust.

Figure 2A:
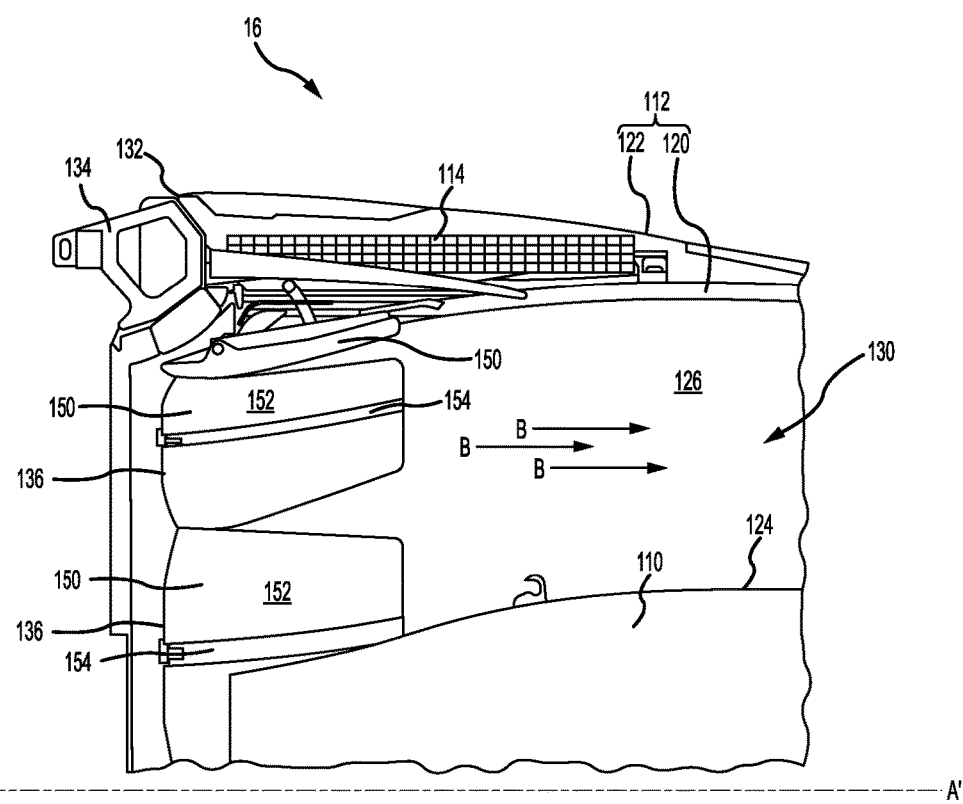
FIGS. 2A and 2B illustrates a cross-section view, taken along the line 2A-2A in FIG. 1A, of a thrust reverser assembly having blocker doors that include hidden drag links, with the thrust reverser assembly in a closed position, in accordance with various embodiments.

With reference to FIG. 2A, a cross-section view of thrust reverser assembly 16 is illustrated with translating sleeve 112 in a closed position. In accordance with various embodiments, translating sleeve 112 includes an inner sleeve portion 120 and an outer sleeve portion 122. A radially outward surface 124 of IFS 110 and a radially inward surface 126 of inner sleeve portion 120 may define, at least, a portion of a bypass flow duct 130 through which bypass air B from fan 104 (FIG. 1B) flows. Cascade 114 is located radially between inner sleeve portion 120 and outer sleeve portion 122.

A plurality of blocker doors 150 are located circumferentially about a central longitudinal axis A-A' of nacelle 10 (with momentary reference to FIG. 1A). Blockers doors 150 are coupled to translating sleeve 112. In FIG. 2A, blocker doors 150 are in the stowed state. Blocker doors 150 are configured to be in the stowed state (or position), when translating sleeve 112 is in the closed position. Stated differently, during forward thrust conditions, blocker doors 150 are in the stowed state. In various embodiments, radially inward surface 126 of inner sleeve portion 120 defines a plurality of grooves, or recesses, configured to receive blocker doors 150. In the stowed state, a first surface 152 of blocker doors 150 is located proximate radially inward surface 126 of inner sleeve portion 120. In various embodiments, first surface 152 of blocker doors 150 may be flush, or planar, with radially inward surface 126 of inner sleeve portion 120. Each blocker door 150 includes one or more drag link(s) 154. The drag link 154 is rotatably coupled to the blocker door 150. In the stowed state, drag link 154 is located proximate first surface 152 of blocker door 150. In various embodiments, first surface 152 of blocker door 150 may define a groove, or recess, configured to receive drag link 154. In the stowed state, drag link 154 may be flush, or planar, with the first surface 152 of its respective blocker door 150. In this regard, drag link 154 does not obstruct the bypass flow B when the blocker doors 150 are in the stowed state. In the stowed state, drag links 154, blocker doors 150, and radially inward surface 126 form a relatively smooth, or flat, radially outward surface of bypass flow duct 130.

In the closed position, a forward end 132 of outer sleeve portion 122 is located proximate a forward bulkhead 134. In various embodiments, in the closed position, forward end 132 of outer sleeve portion 122 may form a sealing interface with forward bulkhead 134. In the closed position, a forward end 136 of blocker doors 150 is located proximate forward bulkhead 134. Forward bulkhead 134 may comprise a generally conical or frustoconical shape. Forward bulkhead 134 may be configured to direct bypass air B toward cascade 114 during reverse thrust (i.e., when translating sleeve 112 is in an open position).

Figure 2B:
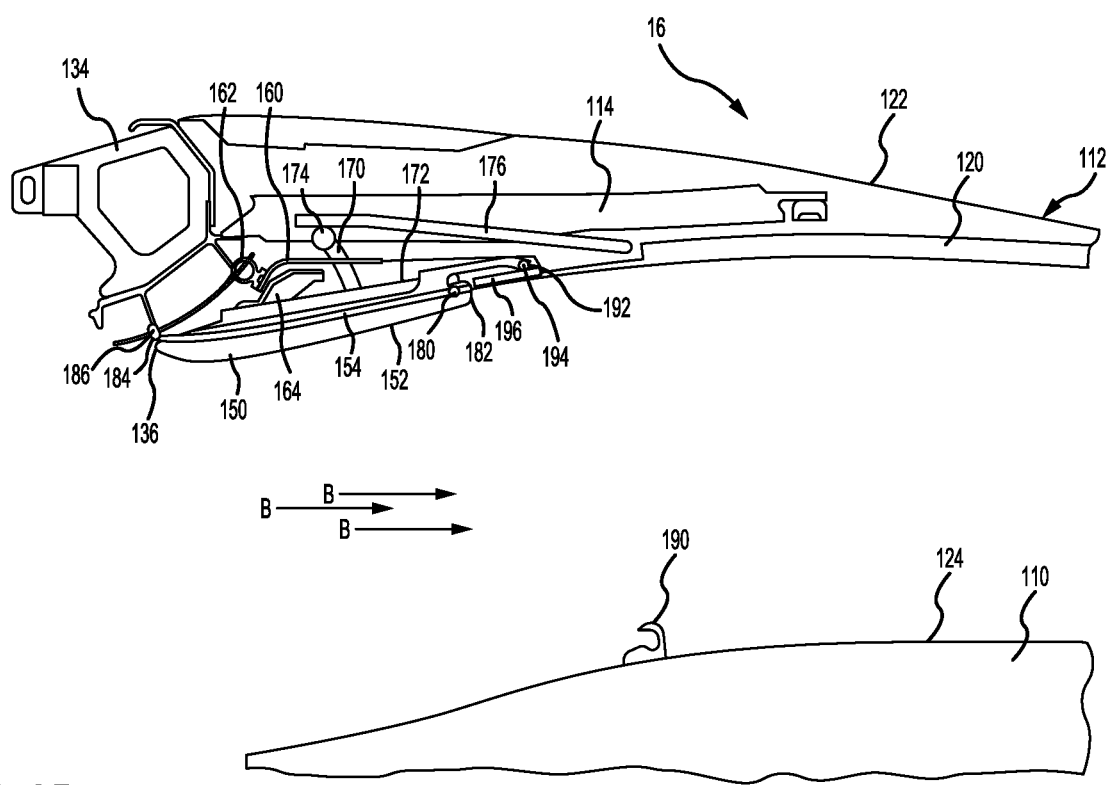

With reference to FIG. 2B, additional details of thrust reverser assembly 16 are illustrated with translating sleeve 112 in the closed position and blocker door 150 in the stowed state. In accordance with various embodiments, translating sleeve 112 further includes a pressure sleeve portion 160. Pressure sleeve portion 160 may be coupled to inner sleeve portion 120. Pressure sleeve portion 160 may extend forward from inner sleeve portion 120. Pressure sleeve portion 160 is located radially inward of outer sleeve portion 122. In the closed position, at least, a portion of cascade 114 may be located radially between pressure sleeve portion 160 and outer sleeve portion 122. In various embodiments, a seal 162 may form a sealing interface between a forward end of pressure sleeve portion 160 and forward bulkhead 134. In various embodiments, seal 162 may be coupled to the forward end of pressure sleeve portion 160, such that seal 162 translates axially via its attachment to pressure sleeve portion 160.

Blocker door 150 includes one or more hinge(s) 164. Hinge(s) 164 rotatably couple blocker door 150 to pressure sleeve portion 160. In this regard, blocker door 150 is configured to rotate, or pivot, about hinge(s) 164 and relative to pressure sleeve portion 160. Stated differently, blocker door 150 is hingedly coupled to pressure sleeve portion 160 of translating sleeve 112.

Blocker door 150 further includes a guide arm 170. Guide arm 170 extends from a second surface 172 of blocker door 150. Second surface 172 is opposite (e.g., oriented away from) first surface 152. In the stowed state, second surface 172 is oriented radially outward (i.e., away from central longitudinal axis A-A') and first surface 152 is oriented radially inward (i.e., toward central longitudinal axis A-A'). Guide arm 170 may be located through an orifice, or slot, defined by (e.g., formed in) pressure sleeve portion 160. In various embodiments, guide arm 170 may include a guide roller 174 located at a distal end of guide arm 170 (e.g., at an end of guide arm 170 that is distal to second surface 172). Guide roller 174 is configured to rotate, or spin, relative to guide arm 170.

Guide roller 174 and the distal end of guide arm 170 may be located in a guide arm track 176. Guide arm track 176 is a stationary structure. In this regard, guide arm track 176 does not translate with translating sleeve 112. Guide arm track 176 may be coupled to cascade 114, forward bulkhead 134, or any other static structure of thrust reverser assembly 16 or nacelle 10. Guide roller 174 may be located in a channel defined by guide arm track 176. Stated differently, guide arm track 176 may define a channel configured to receive guide roller 174. Guide arm track 176 may be oriented in the axial and radially inward directions, such that an aft end of guide arm track 176 in radially inward of a forward end of guide arm track 176. As described in further detail below, guide arm track 176 and guide arm 170 are configured to guide translation of blocker door 150 in a radially inward direction during aft translation of translating sleeve 112, thereby causing drag link 154 to deploy.

In accordance with various embodiments, drag link 154 is rotatably coupled to blocker door 150 at a pivot joint 180. Drag link 154 is configured to rotate about pivot joint 180 and relative to blocker door 150. Pivot joint 180 may be located proximate an aft end 182 of blocker door 150. An aft end 192 of drag link 154 includes a link roller 194. Link roller 194 is configured to rotate, or spin, relative to drag link 154. Link roller 194 may be located in a link track 196. Stated differently, link track 196 may define a channel configured to receive link roller 194. Link track 196 may be coupled to inner sleeve portion 120. Link track 196 is configured to translate with inner sleeve portion 120, thereby causing link roller 194 to translate (e.g., spin and/or slide) axially along link track 196. In the stowed state, link roller 194 and aft end 192 of drag link 154 may be located radially between inner sleeve portion 120 and pressure sleeve portion 160.

A forward end 184 of drag link 154 includes a pin, or protrusion, 186. In the stowed state, pin 186 and forward end 184 of drag link 154 are located at forward end 136 of blocker door 150. In this regard, in the stowed state, pin 186 and forward end 184 of drag link 154 may be located proximate first surface 152 of blocker door 150. In various embodiments, forward bulkhead 134 may define a groove configured to receive pin 186, when blocker door 150 is in the stowed state. A clevis, or hook, 190 is coupled to radially outward surface 124 of IFS 110. Clevis 190 is configured to receive pin 186 during deployment of blocker door 150. As described in further detail below, drag link 154 is configured to rotate about pivot joint 180 as thrust reverser assembly 16 opens such that forward end 184 of drag link 154 deploys (e.g., rotates) radially inward as reverse thrust assembly 16 translates into a reverse thrust position. Drag link 154 is configured to couple to the inner fixed structure, for example, via coupling to clevis 190, as translating sleeve 112 translates to the open position, and to disconnect from IFS 110 (e.g., from clevis 190) as translating sleeve 112 translates from the open position to the closed position.

Figure 3A:
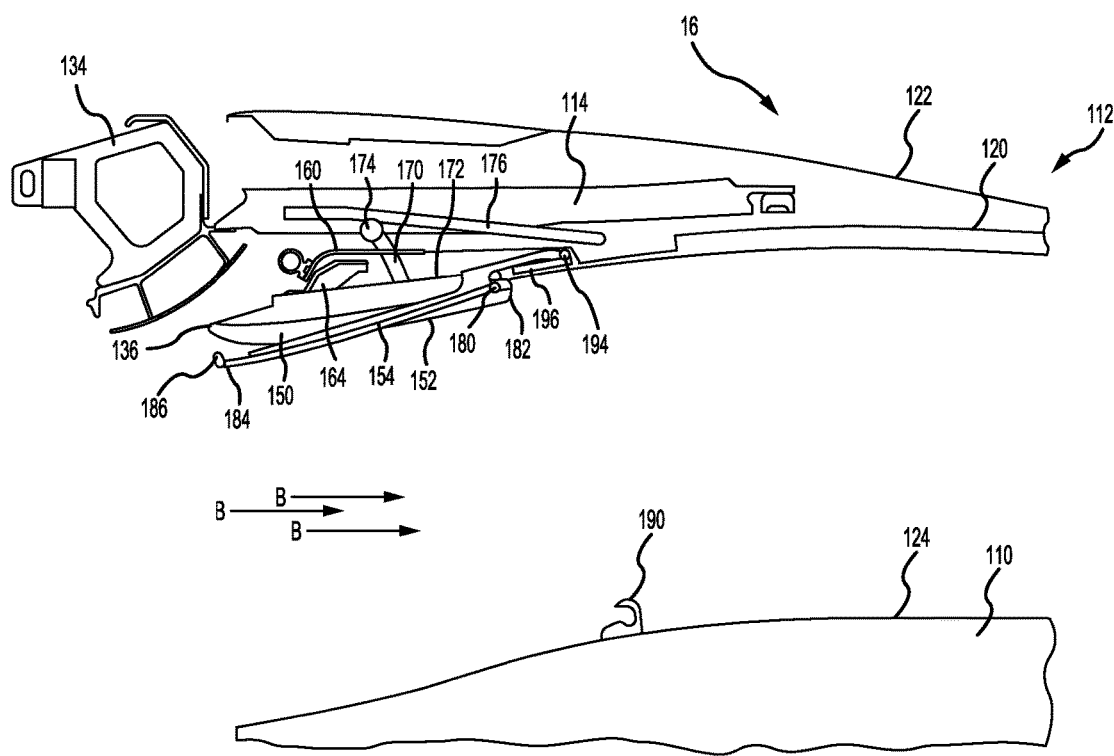
FIGS. 3A, 3B, 3C, 3D, 3E, 3F, and 3G illustrates a cross-section view of a thrust reverser assembly translating from a closed position to a fully open position, in accordance with various embodiments.

With reference to FIGS. 3A, 3B, 3C, 3D, 3E, 3F, and 3G translation of thrust reverser assembly 16 from the closed position (FIGS. 2A and 2B) to the fully open position (FIG. 3G) is illustrated. In FIG. 3A, translating sleeve 112 has begun to translate aft, relative to IFS 110 and cascade 114. As translating sleeve 112 translates aft (e.g., opens), blocker door 150 translates aft due to the coupling between hinge 164 and pressure sleeve portion 160. The aft translation of blocker door 150 causes guide roller 174 to translate (e.g., roller and/or slide) aft along guide arm track 176. In accordance with various embodiments, guide arm track 176 along with guide arm 170 and guide roller 174 tend to facilitate axial and radially inward translation of blocker door 150.

Figure 3B:
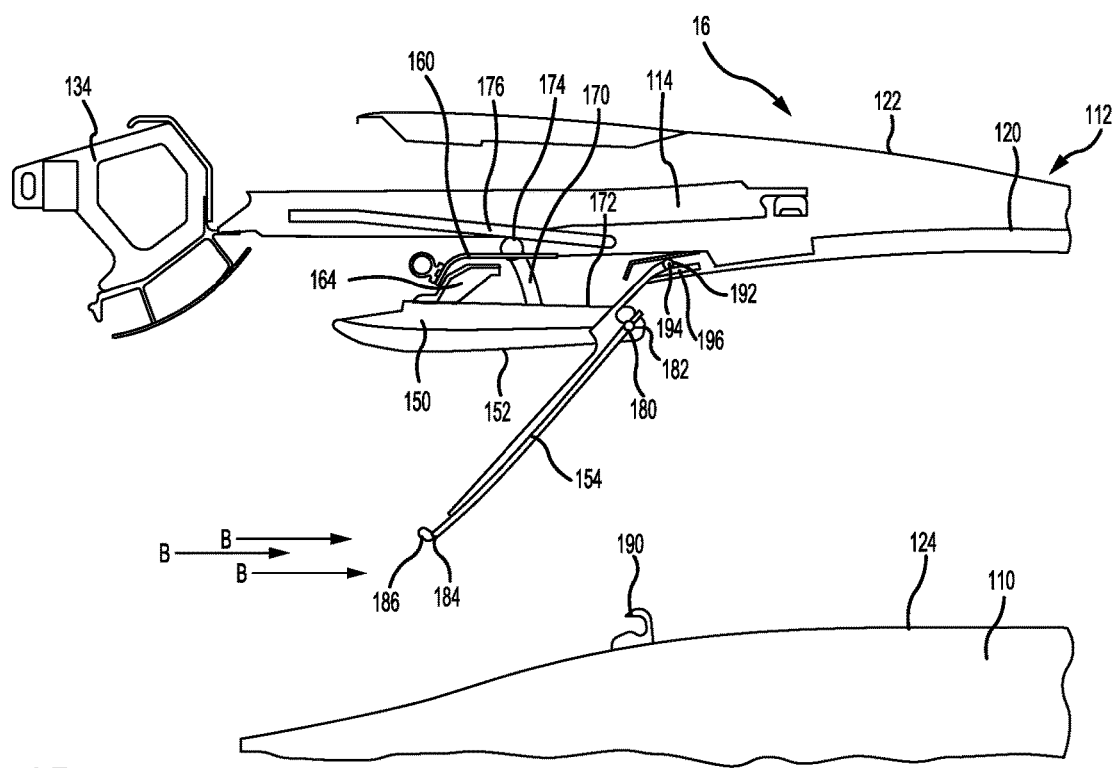

With additional reference to FIG. 3B, a portion of guide arm track 176 is slanted in a radially inward direction proceeding in an aft direction (i.e., the forward end of the radially inwardly slanted portion of guide arm track 176 is radially outward of the aft end of the radially inwardly slanted portion of guide arm track 176). As guide roller 174 translates aft along the radially inwardly slanted portion of guide arm track 176, blocker door 150 is forced radially inward by guide arm 170, thereby causing pivot joint 180 to translate radially inward of inner sleeve portion 120. The radially inward translation of pivot joint 180, relative to inner sleeve portion 120, along with link roller 194 being located in link track 196 causes drag link 154 to rotate about pivot joint 180. In this regard, as translating sleeve 112 begins to translate aft, pin 186 and forward end 184 of drag link 154 translates (e.g., rotates) relative to blocker door 150 and in the radially inward direction. Stated differently, as translating sleeve 112 translates aft, pin 186 and forward end 184 of drag link 154 deploy radially inward toward clevis 190 and IFS 110.

Figure 3C:
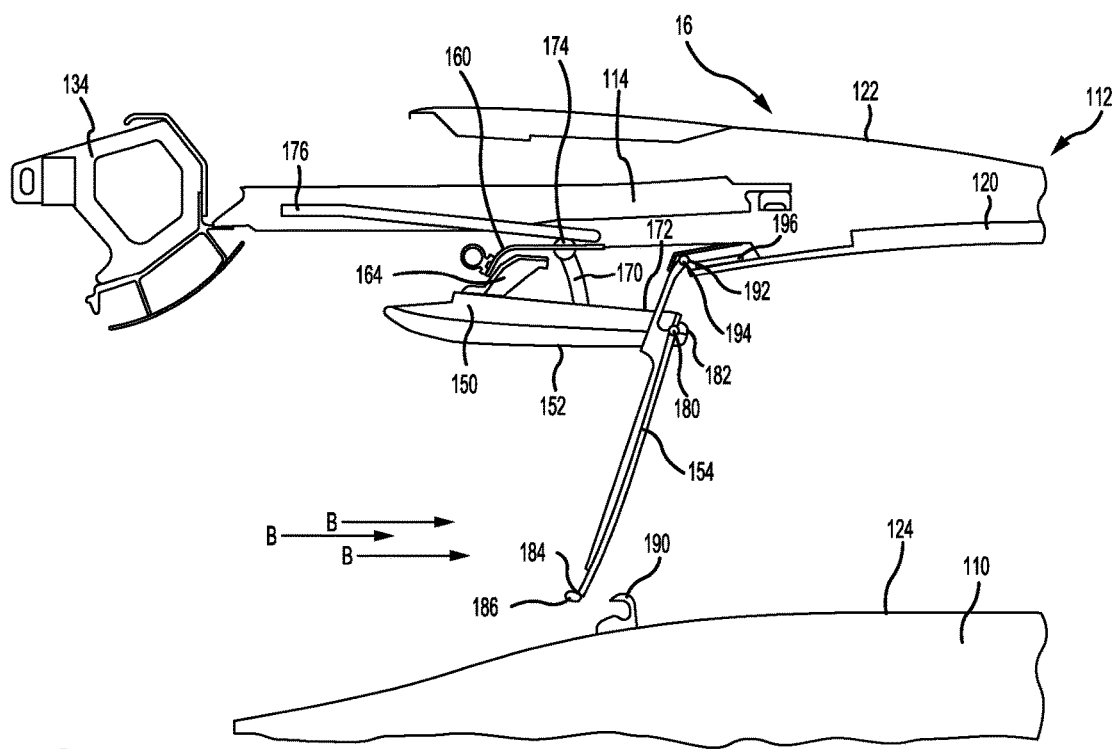

With additional reference to FIG. 3C, as guide roller 174 and guide arm 170 continue to translate aft and radially inward along guide arm track 176, blocker door 150 and pivot joint 180 continue to translate radially inward, thus increasing the radial distance between pivot joint 180 and inner sleeve portion 120. As pivot joint 180 translates radially inward, link roller 194 translates along link track 196. The radially inward translation of pivot joint 180 causes drag link 154 to continue rotating about pivot joint 180. In accordance with various embodiments, guide arm track 176 and guide arm 170 are configured such that blocker door 150 and pivot joint 180 will be forced into a position that rotates drag link 154 to a "clevis engagement position." In the clevis engagement position, pin 186 is axially aligned with the opening in clevis 190 (i.e., pin 186 and the opening in clevis 190 are approximately equal distance from central longitudinal axis A-A'). Guide arm track 176 and guide arm 170 are configured such that blocker door 150 and pivot joint 180 will be forced into the position that causes drag link 154 to rotate into the clevis engagement position, while clevis 190 is still located aft of pin 186. In this regard, guide arm track 176 and guide arm 170 are configured to rotate blocker door 150 and drag link 154 into a position, wherein clevis 190 can receive pin 186 as translating sleeve 112 translates aft.

Figure 3D:
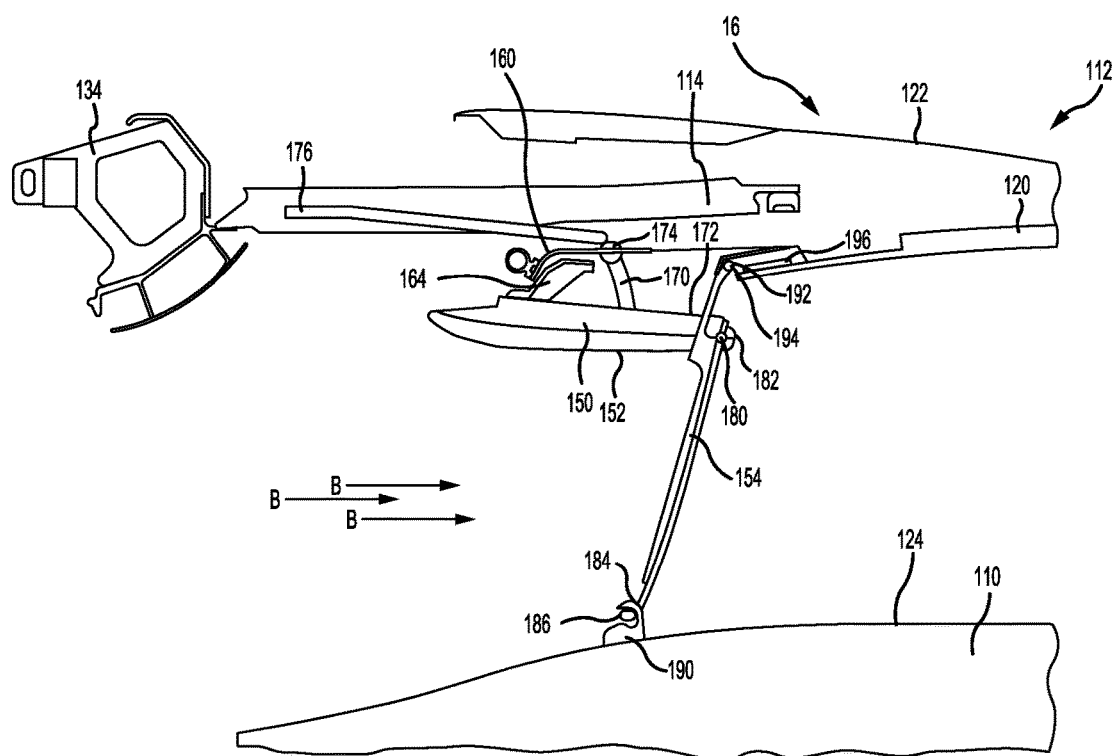
Figure 4:
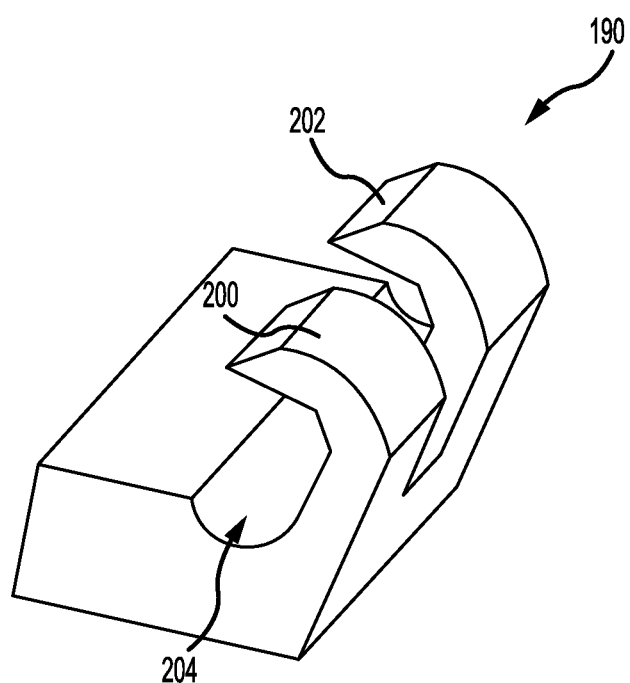
FIG. 4 illustrates a clevis configured to engage a drag link of a thrust reverser assembly, in accordance with various embodiments.

With reference to FIG. 3D, thrust reverser assembly 16 is illustrated in a partially open position with drag link 154 engaged with clevis 190. As translating sleeve 112 continues to translate aft, pin 186 of drag link 154 is received by clevis 190. For example, and with additional reference to FIG. 4, clevis 190 may include two arms (or lugs), such as first arm 200 and second arm 202. In the engaged position, drag link 154 may be located between first arm 200 and second arm 202. A lateral, or circumferential, width of pin 186 is greater than the distance between first arm 200 and second arm 202, such that first and second arms 200, 202 contact and/or catch pin 186, thereby preventing pin 186 from traveling aft of clevis 190.

Figure 3E:
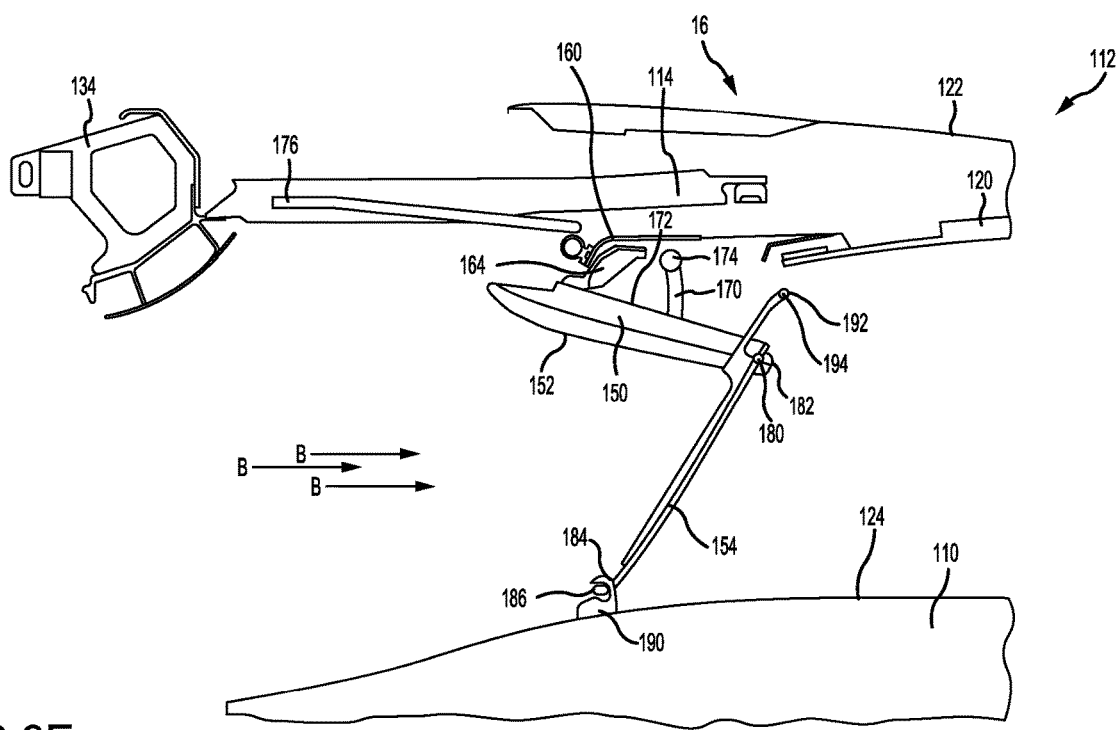

With reference to FIG. 3E, after pin 186 engages with clevis 190, translating sleeve 112 continues translating aft. As pressure sleeve portion 160 translates aft with inner sleeve portion 120, the coupling between hinge 164 and pressure sleeve portion 160 forces hinge 164 and the forward end 136 of blocker door 150 aft. However, the engagement between pin 186 and clevis 190 blocks, or otherwise prevents, forward end 184 of drag link 154 from translating any farther in the aft direction. At this point, blocker door 150 begins to rotate about hinge 164 and toward the fully deployed state.

Figure 3F:
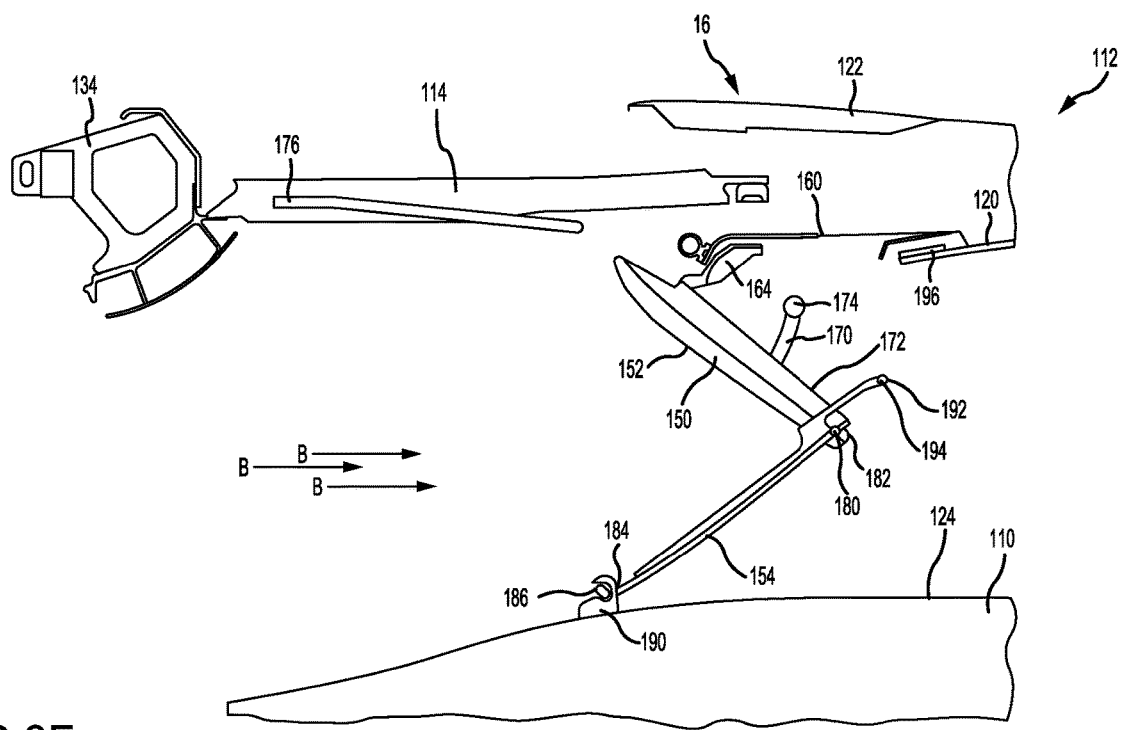
Figure 3G:
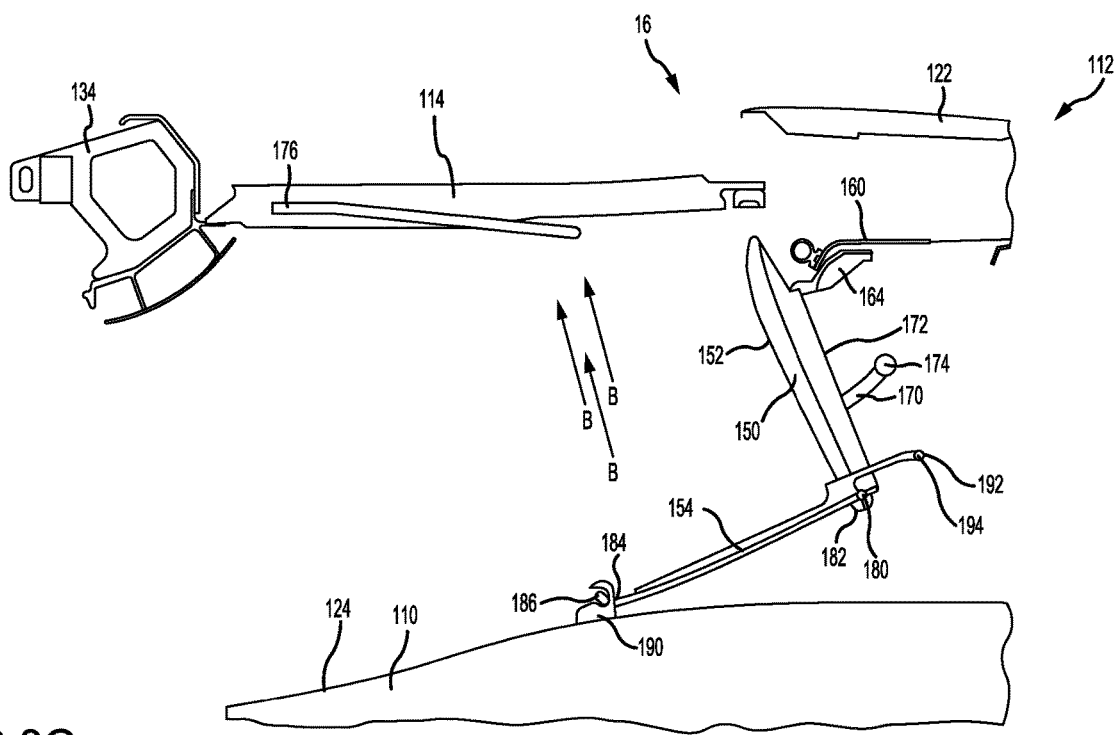

With reference to FIG. 3F, as pressure sleeve portion 160 and hinge 164 continue translating aft with inner sleeve portion 120, blocker door 150 continues to rotate about hinge 164, thereby causing aft end 182 of blocker door 150 and pivot joint 180 translate radially inward toward IFS 110. With reference to FIG. 3G, translating sleeve 112 is shown in the fully open position, with blocker door 150 in the fully deployed state. In the fully deployed state, first surface 152 of blocker door 150 is oriented in the forward direction. In this regard, first surface 152 extends radially in bypass flow duct 130 to, at least, partially block bypass flow B and/or direct bypass flow B toward cascade 114 to generate reverse thrust. In various embodiments, in the fully deployed state, clevis 190 blocks, or otherwise prevents, forward and aft movement of pin 186. In this regard, the shape of a pin groove 204 (FIG. 4) defined by each of first arm 200 and second arm 202 and the shape of pin 186 are configured to allow pin 186 to rotate a desired number of degrees (e.g., to a particular position within pin groove 204). Once pin 186 has rotated the desired number of degrees, the fit of pin 186 within pin groove 204 prevents axial motion of drag link 154. In various embodiments, pin 186 may have an oval, elliptical, or racetrack cross-section, where the cross-section is taken in a plane parallel to central longitudinal axis A-A'.

In the fully deployed position, drag link 154 provides a structural load path between the blocker door 150 and the IFS 110, and supports blocker door 150 against the force of bypass flow B. In the stowed position, drag link 154 is located along the radially outer surface of bypass flow duct 130 (e.g., flush with first surface 152 of blocker door 150), which tends to reduce drag and/or noise of bypass airflow through bypass flow duct 130.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods, and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thrust reverser assembly, comprising:
   a cascade of vanes;
   a sleeve configured to translate relative to the cascade of vanes, the sleeve including an inner sleeve portion, an outer sleeve portion, and a pressure sleeve portion, the pressure sleeve portion being located radially inward of the outer sleeve portion and extending forward from the inner sleeve portion;
   a blocker door hingedly coupled to the pressure sleeve portion;
   a drag link pivotably coupled to the blocker door, wherein a forward end of the drag link is configured to deploy radially inward in response to aft translation of the sleeve;
   a link roller located at an aft end of the drag link; and
   a link track coupled to the inner sleeve portion and configured to receive the link roller such that the link roller causes the drag link to rotate about a pivot joint located proximate an aft end of blocker door;
   wherein the drag link is pivotably coupled to the blocker door via the pivot joint located proximate the aft end of the blocker door and the aft end of the drag link.

2. The thrust reverser assembly of claim 1, wherein the drag link is located along a first surface of the blocker door, when the blocker door is in a stowed state.

3. The thrust reverser assembly of claim 2, wherein the blocker door includes a guide arm extending from a second surface of the blocker door, the second surface being opposite the first surface.

4. The thrust reverser assembly of claim 3, further comprising a guide arm track configured to receive a distal end of the guide arm, wherein a portion of the guide arm track is sloped in a radially inward direction proceeding in an aft direction.

5. The thrust reverser assembly of claim 4, further comprising a guide roller rotatably coupled to the distal end of the guide arm and located in the guide arm track.

6. The thrust reverser assembly of claim 1, further comprising a clevis configured to receive a pin located at the forward end of the drag link.

7. The thrust reverser assembly of claim 6, wherein locating the pin in the clevis prevents aft translation of the forward end of the drag link and causes the aft end of the blocker door to rotate radially inward in response to aft translation of the pressure sleeve portion.

\* \* \* \* \*